United States Patent [19]

Brockelsby et al.

[11] Patent Number: 5,631,642
[45] Date of Patent: May 20, 1997

[54] MOBILE OBJECT TRACKING SYSTEMS

[75] Inventors: W. Keith Brockelsby; Conrad M. Brownlee-Walker; Micheal L. Hryciuk, all of Edmonton, Canada; Martin C. Van Breda, The Willows, South Africa

[73] Assignee: Austec Electronic Systems Limited, Edmonton, Canada

[21] Appl. No.: 212,887

[22] Filed: Mar. 14, 1994

[30] Foreign Application Priority Data

Mar. 12, 1993 [ZA] South Africa ............... 93/1786

[51] Int. Cl.$^6$ ................................. G08G 1/123
[52] U.S. Cl. ............... 340/993; 340/426; 340/989; 340/991; 342/457
[58] Field of Search ................. 340/426, 988, 340/995, 989, 991, 992, 993, 933, 928, 905, 539, 994; 364/449; 342/457, 450, 357

[56] References Cited

U.S. PATENT DOCUMENTS

| | | | |
|---|---|---|---|
| 3,646,580 | 2/1972 | Fuller et al. | 340/989 |
| 3,697,941 | 10/1972 | Christ | 340/992 |
| 3,864,674 | 2/1975 | Worsham et al. | 340/539 |
| 4,107,689 | 8/1978 | Jellinek | 340/991 |
| 4,177,466 | 12/1979 | Reagan | 340/426 |
| 4,209,787 | 6/1980 | Freeny, Jr. | 340/993 |
| 4,350,970 | 9/1982 | von Tomkewitsch | 340/989 |
| 4,818,998 | 4/1989 | Apsell et al. | 342/457 |
| 5,223,844 | 6/1993 | Mansell et al. | 342/357 |
| 5,289,183 | 2/1994 | Hassett et al. | 340/991 |
| 5,291,411 | 3/1994 | Bianco | 340/992 |
| 5,347,274 | 9/1994 | Hassett | 340/989 |

*Primary Examiner*—Brent A. Swarthout
*Attorney, Agent, or Firm*—Herbert Dubno

[57] ABSTRACT

The invention relates to a mobile object tracking system for tracking mobile objects such as vehicles. An array of signpost stations is distributed around an area to be monitored, each signpost station being arranged to transmit a signpost identification signal. An object-based receiver is arranged to receive a signpost identification signal in the event of the object being located within a predetermined distance of a signpost station. An object-based beacon transmitter transmits an object identification signal and an object location signal derived from the signpost identification signal to a central control station via a network of receiver stations. The object is identified and the position of the object is located at the control station on the basis of the object identification and location signals transmitted from the beacon transmitter. The invention extends to a method of tracking mobile objects.

8 Claims, 3 Drawing Sheets

MOBILE OBJECT TRACKING SYSTEMS

FIELD OF THE INVENTION

This invention relates to a mobile object tracking system, and in particular to a vehicle tracking system.

BACKGROUND OF THE INVENTION

The theft and hijacking of motor vehicles in South Africa and elsewhere in the world has recently increased at an alarming rate. This trend is likely to continue in the future. Most existing vehicle anti-theft systems are relatively ineffective, and are not of great assistance to law enforcement agencies. In the light of the greater burden being placed on law enforcement agencies as a result of escalating crime and violence, vehicle owners are being forced to adopt alternative methods for protecting their vehicles which do not rely solely on protection by the authorities.

The amount of money lost directly and indirectly as a result of vehicle theft and hijacking in South Africa is estimated at being over six billion Rands per annum. Vehicle insurers are consequently paying vast sums of money in compensation, giving rise to exorbitant premiums. As a result, only about 25% of the vehicles in South Africa are insured.

A number of vehicle protection networks have recently been developed. South African patent 89/0103 discloses a vehicle security system which includes a number of security stations positioned strategically within an area which is to be monitored, such as a parking lot.

The security stations each have a low-powered transmitter and a low-powered receiver. If the vehicle is stolen, the radio transmitter carried by the vehicle is automatically actuated. Once such a vehicle comes within the range of one of the security stations, the signal transmitted from the vehicle is detected by the receiver at the security station, which then transmits an initial signal to the vehicle, causing it to be immobilised. A further signal is transmitted from the security station to a base station for identifying the location of the security station.

Recently passed legislation forbids the remote immobilisation of a vehicle, thereby placing limitations on the effectiveness of the systems described in patent 89/0103. In addition, a large number of security stations need to be distributed over a particular area in order to cover that area effectively. The relatively high powered transmitters in the security stations add significantly to their costs.

South African patent 89/0287 describes a locating system using a stationary unit or a mobile transmitting unit situated in a police or emergency vehicle. At least three receiving stations at known locations receive and process a randomly modulated radio signal emanating from the mobile transmitting unit. The signal is then transmitted from the receiving station to a central processing facility. This central processing facility determines the arrival time differences of the same modulated signal at each of the receiving stations and uses the data to locate the transmitting unit. In this system, a common time mark signal is required for establishing a common time base. Furthermore, relatively sophisticated and accurate circuitry needs to be employed to pinpoint the transmitting unit on the basis of the calculated time differences.

OBJECTS OF THE INVENTION

It is therefore the principal object to provide an improved tracking system overcoming the drawbacks of the prior art.

Still another object of the present invention is to provide a method of tracking a mobile object.

SUMMARY OF THE INVENTION

According to a first aspect of the invention, there is provided a mobile object tracking system comprising:
- a) an array of signpost stations distributed around an area to be monitored, each signpost station being arranged to transmit a signpost identification signal;
- b) an object-based receiver arranged to receive a signpost identification signal in the event of the object being located within a predetermined distance of a signpost station;
- c) an object-based beacon transmitter arranged to transmit an object identification signal and an object location signal derived from the signpost identification signal; and
- d) a central control station for identifying and locating an approximate position of the object on the basis of the object identification and location signals transmitted from the beacon transmitter.

In a preferred form of the invention, the mobile object tracking system includes a network of receiver stations, each receiver station having receiving means arranged to receive the object identification and location signals and transmission means to relay the signals to the central control station.

Preferably, the receiver stations include position locating means for generating on the basis of the object identification signal, a positional signal relating to the position of the mobile object.

Conveniently, the position locating means include a directional antenna, and the positional signal is a directional signal derived from the antenna.

Typically, the tracking system includes at least one mobile tracking unit having a position locating unit for homing in on an object once its approximate location has been established.

Remote arming means are preferably provided for arming the object-based receiver and beacon transmitter.

Advantageously, the mobile object tracking system includes a mobile receiver associated with each beacon transmitter, the mobile receiver having indicator means for indicating when activation of a particular beacon transmitter has taken place.

Conveniently, the mobile object tracking system includes a remote activator for triggering the beacon transmitter.

The activator typically includes entry means for entering various emergency condition codes for transmission to the object-based receiver.

The remote activator is preferably based at the control station, and utilizes an existing telecommunications network.

Preferably, the signpost stations include keypoint signpost stations which incorporate a beacon enabling unit or activator arranged to cause the beacon units to transmit their identification signals regardless of the status of the beacon units, thereby to monitor objects passing a keypoint.

Advantageously, the object identification signal and the object location signal form a combined signal comprising object identification data, message type data, input status data, signpost data and checking data.

The object location signal conveniently comprises signpost identification data representative of at least two signpost stations which have most recently been traversed by the object, and timing data representative of the time lapsed since traversing of the signpost stations.

The invention extends to a method of tracking a mobile object comprising the steps of:

a) covering an area to be monitored with an array of signpost stations;

b) transmitting a signpost identification signal from at least one of the signpost stations;

c) receiving the signpost identification signal at the mobile object in the event of the mobile object moving into a field covered by the signpost identification signal;

d) transmitting from the mobile object an object identification signal and an object location signal derived from the signpost identification signal; and e) identifying and locating the approximate position of the mobile object on the basis of the object identification and location signal.

The method conveniently includes the steps of covering the area to be monitored with an array of receiver stations, receiving, at one of the receiver stations, the object identification and locatio signals, relaying the object identification and location signals to a control station, and monitoring the progress of the mobile object at the control station.

Typically, the method includes the steps of accumulating a plurality of different signpost identification signals as the mobile object moves through successive fields covered by different signpost stations and transmitting the plurality of signpost identification signals to the central control station for enabling the route of the mobile object to be tracked.

Preferably, the method includes the steps of providing, at least some of the receiver stations, position locating means, generating a positional signal on the basis of the object identification signal and independently of the signpost identification signal, and transmitting the positional and object identification signals to the control station.

The method may include the further steps of entering message-type data for receipt at the mobile object and transmitting the message-type data in conjunction with the object location and identification signals.

BRIEF DESCRIPTION OF THE DRAWINGS

The above and other objects, features and advantages will become more readily apparent from the following description, reference being made to the following drawing, in which.

SPECIFIC DESCRIPTIONS

Figure 1:
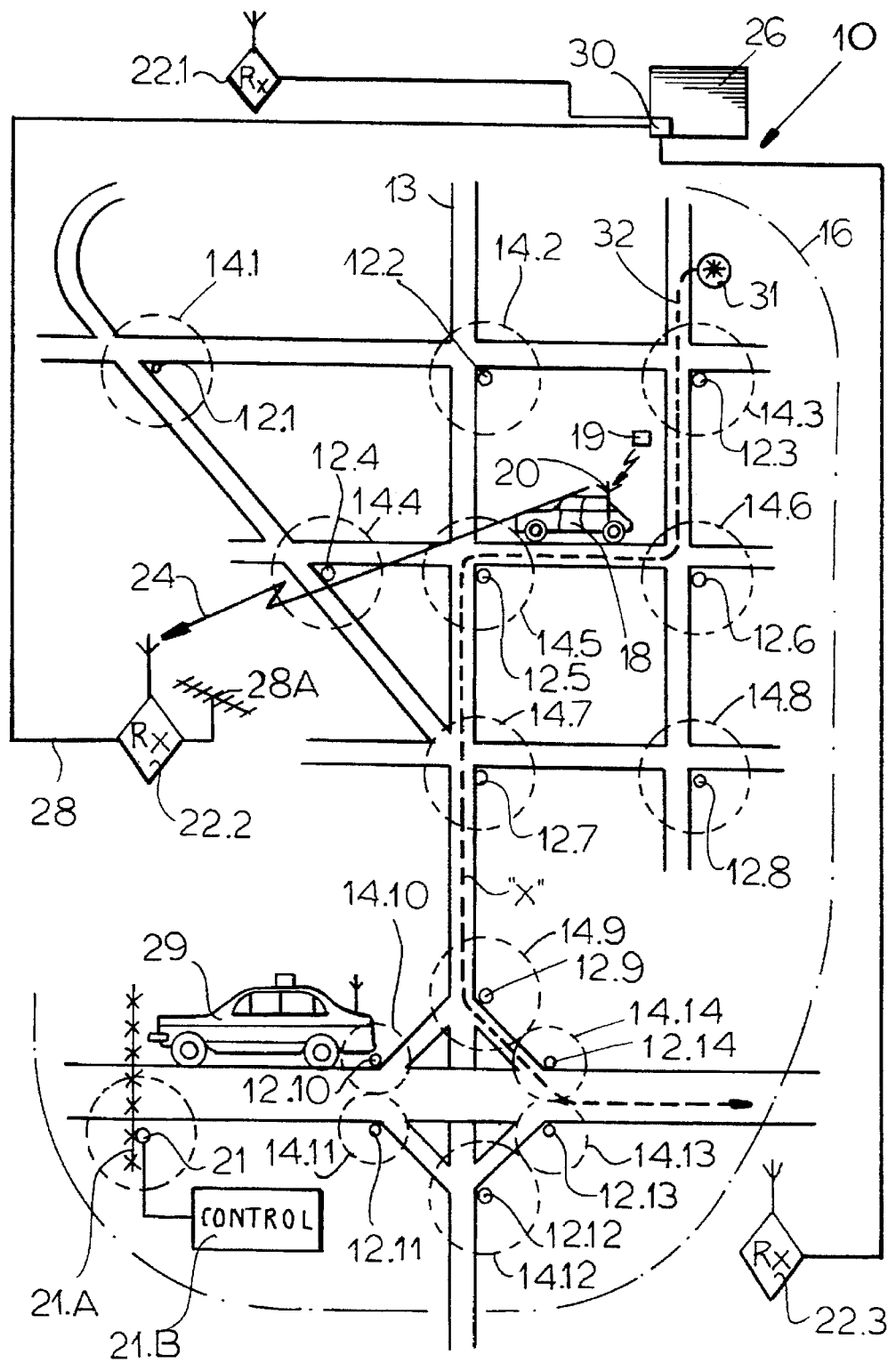
FIG. 1 is highly schematic diagram of a layout of the basic components making up an object tracking system of the invention.

Referring to FIG. 1, a vehicle tracking system 10 includes an array of signpost stations 12.1 to 12.14 generally positioned at nodes, or key intersection points in a road network 13. Each signpost station 12.1 to 12.14 has a respective area of coverage, of footprint 14.1 to 14.4 with a radius of approximately 50 m.

An area 16 to be monitored can thus be covered by distributing the array of signpost stations so that their footprints cover all or most of the possible routes that may be taken by a vehicle. The signpost stations 12.1 to 12.14 are typically attached to lamp posts or buildings which are well out of reach of passers-by and are arranged to give coverage at key intersections, as is illustrated in FIG. 1. The signpost stations may also be clustered around the on-and-off ramps of arterial routes, as is shown at 12.9 to 12.14, as well as at the exits and entrances of parking lots, at toll gates, at border posts and at other locations where traffic movement is concentrated. Each signpost station is fitted with a radio transmitter arranged to transmit a signpost identification signal covering the footprint of the signpost station in question.

A protected vehicle 18 is fitted with a beacon unit 20 at a hidden location, the unit including a vehicle transmitter and a vehicle receiver. A remote actuator 19 carried on a key ring, for instance, allows the beacon unit 20 to be armed and disarmed externally of the vehicle. The beacon unit provides an indication that it has been armed by flashing the vehicle's lights or a dashboard-based light, or alternatively by sounding the hooter or an audible buzzer mounted on the dashboard. When the beacon unit is armed, one or more sensors, such as a motion sensor or a door-mounted microswitch, will sense unauthorized entry into the vehicle and will cause the beacon unit to transmit intermittently a brief radio distress signal containing vehicle identification details, together with a signpost signal which is received from a proximate signpost station such as the signpost station 12.6 when the vehicle traverses the signpost footprint 14.6.

Normally, the beacon only transmits signpost information if it has been activated. Special keypoint signpost stations 21 incorporating a beacon enabling unit or activator may be installed so as to cause the beacon units to transmit their identification signals regardless of the state of the beacon. These special signpost stations can be placed at key points such as border crossings 21A and entrances to restricted areas, as well as route markers along designated routes. Progress of legitimately operated vehicles past such key points can then be monitored at local control posts 21B.

A receiver network comprises a plurality of fixed receiving stations 22.1 to 22.3 which are more sparsely arranged than the signposts, with an operating range of approximately 6 km. A combined signal 24 transmitted from the beacon unit 20 is received at the receiving station 22.2. This combined signal 24, which is modulated both with a beacon identification signal identifying the signpost station 12.6 and with a vehicle identification signal identifying the vehicle 18, is relayed from the receiving station 22.2 to a central control station 26 via a telephone or radio link 28. The other receiving stations 22.1 and 22.3 are similarly connected to the central control station 26. The receiving stations 22.1 to 22.3 are completely automatic in locating stolen vehicles and reporting the information to central control stations.

The receiving may optionally also include automatic direction finding aerials 28A which relay the bearings of beacons from which signals have been received to the control station, together with the relevant vehicle identification signals.

This technique allows the position of a stationary vehicle which is not within the footprint of a signpost station to be determined by way of intersection, independently of the network of signpost stations. A stationary vehicle situation may arise when a vehicle is calling for breakdown or out-of-fuel assistance. Any additional mobile receivers incorporating direction finding aerials may be carried on a patrol or recovery vehicle 29 and/or a light aircraft or helicopter which may be used to intercept and to recover the stolen vehicle 18.

The central control station 26 receives and records all distress calls in a data bank 30. The beacon and vehicle identification signals are decoded and matched to an existing database which incorporates details of all the vehicles protected by the system, as well as details of the signpost stations. This information can conveniently be displayed on a mimic panel or on an electronic map on a computer terminal. Lines stations on the map, allowing the operator to easily combine available signpost and bearing data for vehicle position determination.

Information relating to the stolen vehicle, such as its make, registration number, engine number and color, as well as the location of the vehicle provided by the nearest signpost station, is relayed to the recovery vehicle 29 or a light aircraft, which is then directed to the location of the stolen vehicle. It is important to note that a recovery vehicle fitted with a suitable receiver can receive beacon signals directly and determine the target position from its own signpost station and bearing data.

This allows recovery vehicles to operate independently of the fixed receiver network and control center. The control center 26 is backed up by a comprehensive management information system and a communications network which may form part of an existing telephone network.

At the control center 26, the aforementioned mimic panel comprising extensive maps indicating the area of coverage 16 may be provided, or an electronic mapping system may be used. The precise location of each signpost station 12.1 to 12.14 and each receiver 22.1 to 22.3 is indicated on the maps by means of LEDs. A vehicle is stolen at location 31, for example. As the stolen vehicle 18 moves along an escape route indicated at 32, it will traverse the footprints 14.3, 14.6, 14.5, 14.7, 14.9 and 14.14 covered by the correspondingly numbered signpost stations. The beacon unit 20 is arranged to store the last received signpost identification signal and to transmit it with the next signpost identification signal that is received. Consequently, when the vehicle reaches the point "X", it will be transmitting two signpost identification signals from the signpost stations 12.5 and 12.7. As a result, the progress of the vehicle can be monitored and tracked at the control station.

If a signal from, say, the signpost beacon 12.5 is not received by the beacon unit 20 on the vehicle as the vehicle travels through a low reception area such as a valley, the beacon unit 20 will detect the subsequent signal from the signpost station 12.7 and will retransmit it to the receiving station 22.2, from where it will be relayed back to the central control station 26.

Consequently, the stolen vehicle 18 will not be lost while its route is being plotted. The recovery vehicle 29 may pinpoint the stolen vehicle using a mobile receiver and a manually operated directional antenna. Effective coverage of an area by signpost stations could be ensured by encouraging residents of a particular area to invest in signpost stations and low cost receiving stations for enhancing tracking in their particular area.

Where continuous and accurate tracking of vehicles is required, such as is the case with commercial vehicles or particularly expensive cars, a GPS navigation receiver can be added to the beacon unit 20 in a vehicle, thereby allowing the vehicle to be monitored continuously with an accuracy to the nearest 50 m to 100 m. The disadvantage of a GPS receiver is that it is a relatively costly and bulky piece of equipment, which is difficult to protect and to conceal against destruction.

Figure 2:
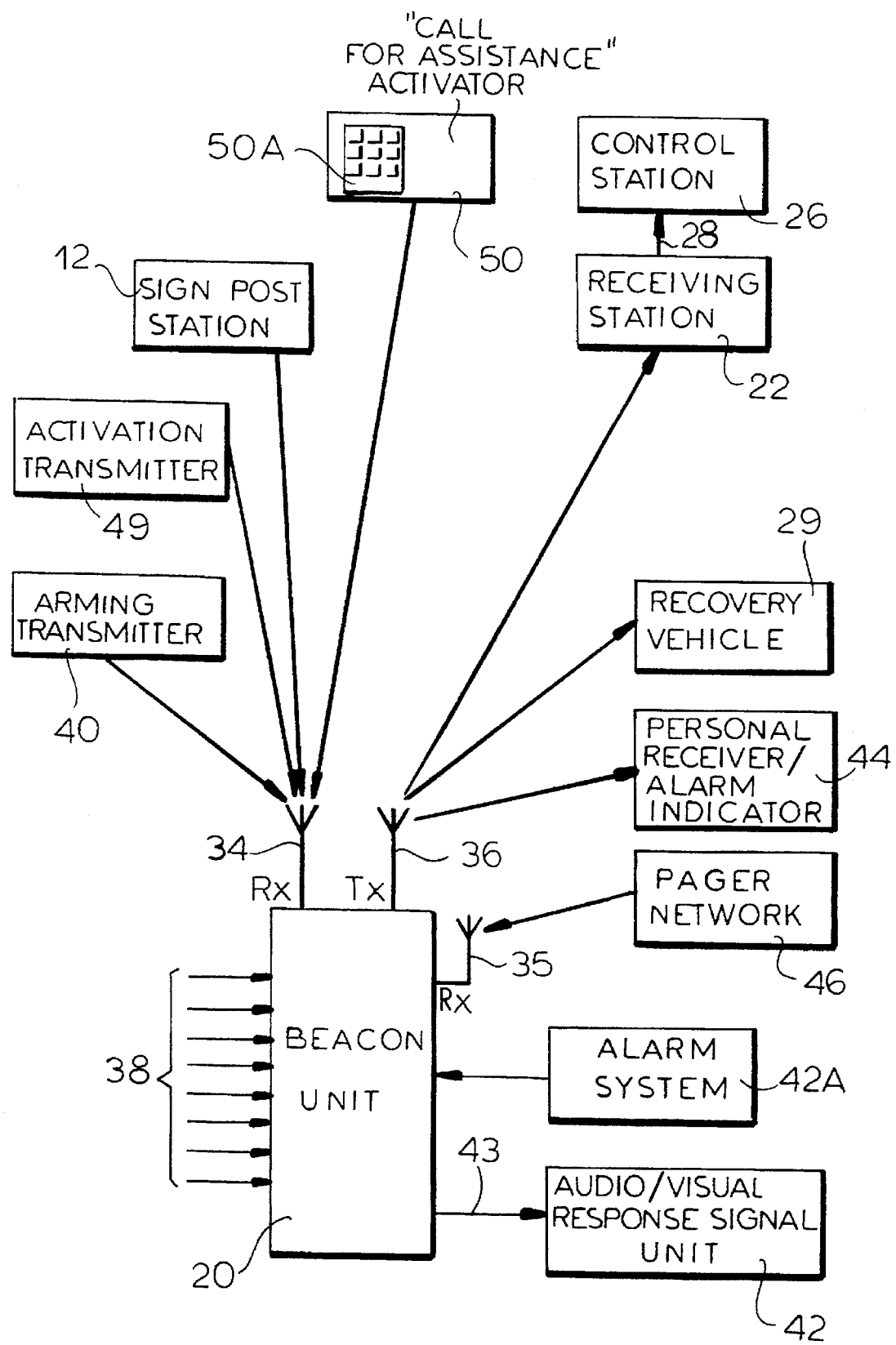
FIG. 2 is a more detailed schematic block diagram incorporating additional system components.

Referring now to FIG. 2, a more detailed block diagram of a vehicle tracking system is shown. The beacon unit 20 is shown fitted with two receiving antenna 34 and 35 and a transmitting antenna 36. As was described previously, the beacon unit 20 has various direct arming and disarming inputs 38. An arming transmitter 40 having a range of less than 50 m may be provided in the form of a keyring activator.

A 128 bit signal is transmitted from the beacon unit 20. The coding of the signal is in the form of on/off keying. FSK-keying may also be used. The choice of operating frequencies will depend on what allocation is made by the regulating authorities.

The present system transmits at approximately 900 MHz, thereby allowing for compact and high efficiency antennas. Frequency transmission ranges include a range around 400 MHz and the 800–1500 MHz range. The 128 bits transmitted from the beacon unit can be assigned as follows:

| | |
|---|---|
| Preamble | 8 bits |
| ID Data | 48 bits: Province-3, Licence #-27 |
| Message type | 8 bits |
| Input status | 8 bits |
| Signpost data | 30 bits |
| Spare CRC Checksum | 8 bits |
| TOTAL | 128 bits |

Different message lengths can also be used if required.

The data is transmitted at a rate of 3.75 kHz, and the transmission comprises a 20 millisecond continuous "on" signal followed by 128 bits of data lasting 34.2 milliseconds. The signal is repeated at varying intervals of approximately 1 second. This varying interval between transmission is introduced so that if two beacon units should transmit simultaneously on one transmission, they will not do so on the next transmission. Statistical calculations and practical experiments have demonstrated that at least 10 simultaneously activated beacons can be accommodated on one receiver in this way using the above timing parameters. Varying signal strengths due to vehicle movement, as well as the overlapping coverage from adjacent receiving stations, would assist in resolving any ambiguous signals.

Some message types can be defined as follows:

1-Reserved
2-Normal Theft
3-Hijack
4-Breakdown
5-Medical Emergency
6-Collision
7-Police
8-Other data in signpost field.

The 30 bit signpost field can be interpreted as a 13 bit signpost identification signal followed by a 4 bit number encoded with the time elapsed since reading the signpost, followed by a second 13 bit identification signal representing the identification of the previous signpost received. The age of the signpost signal is a further aid in determining the speed and position of the vehicle being tracked. When the message type indicates other data, such as GPS data, the signpost field will be interpreted accordingly.

The beacon antennas 34, 35 and 36 are normally mounted separately from the beacon unit 20, with the interconnecting cable link being in the order of 1 m long.

The vehicle beacon unit 20 is designed to withstand extremes of temperature and humidity. As has previously been described, the beacon unit 20 may be armed via the key ring activator 40 using a 48 bit activation code currently transmitted at 406 MHz.

The receiver in the beacon unit 20 is capable of accepting this code along with 4 command bits, for use as will be described further on in the specification. For this option, the beacon unit provides an output to flash the parking lights or to bleep the horn once for arming and twice for disarming, as is shown at 42.

The beacon unit 20 is arranged to accept an input from an existing alarm system 42A which arms and disarms it. An alarm indication may be provided either by an RF link, an audible alarm or both. In order to minimize false alarms, RF transmission does not begin until after about 20 seconds of the alarm indication, thereby giving legitimate users of the vehicle time to disarm the beacon unit.

There are two options for automatic activation, depending on whether there is an existing alarm or not. The first option incorporates a stand alone system, in which a number of inputs 38 are provided, with a signal on any one of them resulting in activation of the beacon unit. These may include a door switch, a brake switch, the ignition switch, boot or bonnet switches or a radio interlock. The beacon unit provides an output 43 capable of driving an alarm 42 to provide immediate indication of activation. A personal receiver 44 having a range of between 50 m and 500 m could also be used as an alarm indicator, although this would only respond after RF transmission had begun. This personal receiver may be carried by the vehicle owner to allow him or her to monitor the beacon unit 20 from indoors. The personal receiver 44 is arranged to respond to a specific beacon unit code.

A similar unit could be used by security guards at parking lots and parking garages to receive alarm signals from vehicles in their care. In this application, the receiver 44 would be adapted to respond to all alarm codes. An internal DIP switch is used to set a code to which the receiver will respond, with one setting allowing for receipt of all codes.

In the event of a vehicle 18 being hijacked without an opportunity to arm or to activate the beacon unit 20, it is possible for the control center 26 to activate the beacon unit remotely. This may be achieved in a number of ways. First, an existing pager network 46 may be used, in which case the receiving antenna 35 is used as a paging receiver which is integrated into the beacon unit 20. Second, FM broadcast stations with radio data service capability carried on FM broadcast channels may be used. This is an attractive option, in the light of the wide signal coverage offered. Further, this link may be used to test beacons remotely, or to enable and disable beacons in a network in response to the payment or non-payment of a service fee. The normal arming and disarming methods would not be capable of overriding the remote activation function, which is designed to operate at ranges over 25 km, and there will be no indication that activation has occurred.

Medium range activation up to 1 km is required so that approaching security forces can distinguish a stolen vehicle 18 from within a group of vehicles and can activate the vehicle immobilizer, provided it is stationary. An activation transmitter 49 may be tuned on the frequency of the keyring activator 40 using the correct code plus an auxiliary control code which will cause one or more of the vehicle lights to flash, or allow immobilization of the vehicle.

A short range "call for assistance" activator 50 may further be provided to transmit various emergency condition codes of the type described above, including "hijack/police", "breakdown", "medical aid" and "accident". In order to select these codes, the activator 50 is in the form of a remote hand-held unit having a keypad 50A with separate buttons for the various emergency condition codes, as well as a cancellation button for cancelling messages. The short range activator 50 has the same range as the key ring activator 40, namely less than 50 m, and may be used by a hijack victim to activate the beacon unit 20 as the hijacked vehicle 18 departs. The normal arming and disarming regime will not be able to override this function, and there will be no indication that activation has occurred. All three of the activators 40, 49 and 50 operate via the antenna 34.

Figure 3:
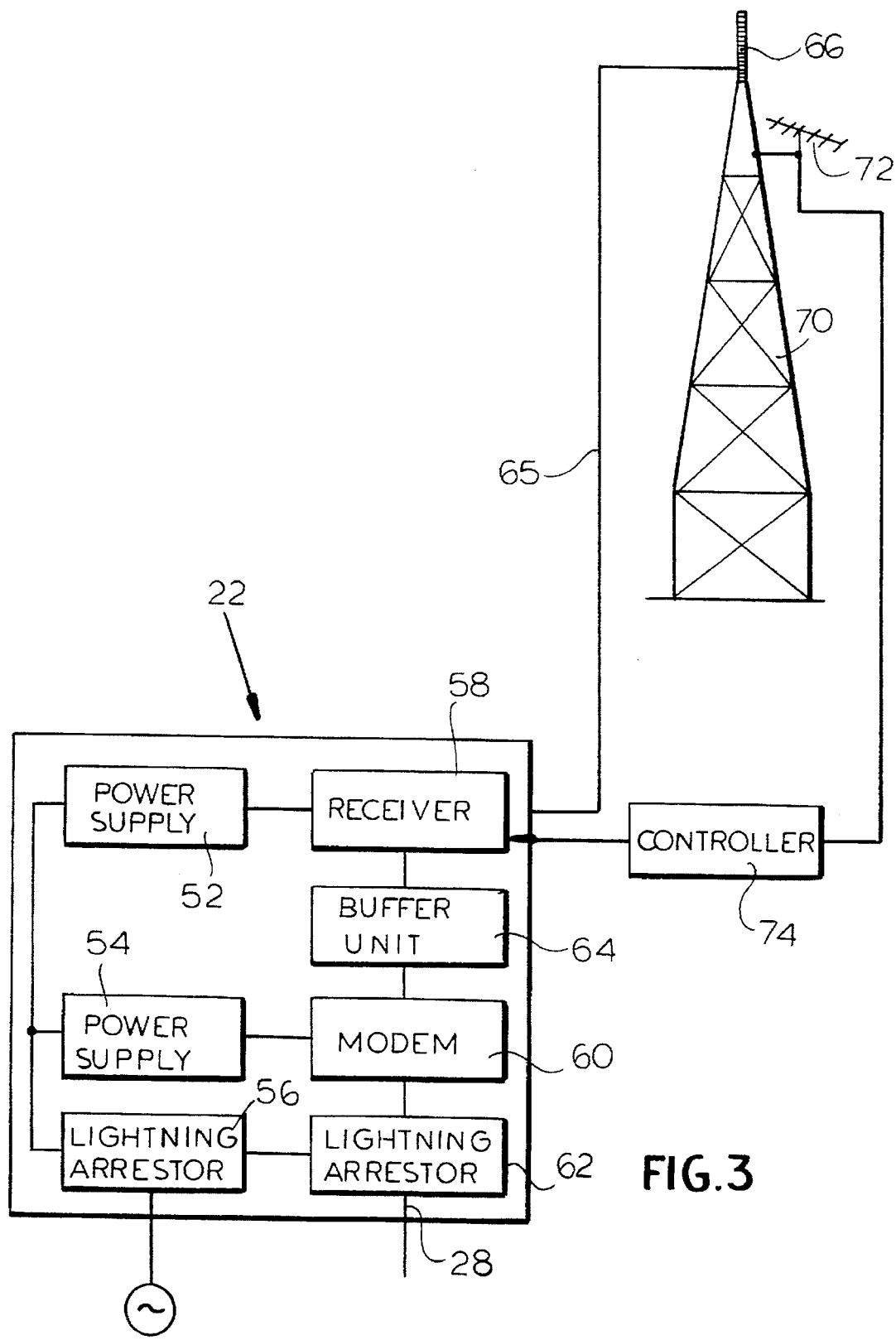
FIG. 3 is a schematic block diagram of a fixed receiver forming part of the vehicle tracking system of the invention.

The fixed network receiving station 22 is illustrated in more detail in FIG. 3. The receiving station 22 is capable of unattended operation, and is able to switch from audio reception for maximum range to digital reception for receiving specific data either automatically or by remote command. The fixed network receiver is capable of sweeping over a narrow bandwidth to allow optimum tuning for a variety of signpost stations. A typical receiver 22 has a circular reception range with a radius of 6 km. This means that it is capable of completely covering a square having sides of 8.5 km. The receiving station 22 comprises a pair of separate power supplies 52 and 54 fed by a 220 volt mains supply via a lightning arrestor 56. The receiver 58 within the receiving station 22 is interfaced to a modem 60. This allows it to relay its messages to the central control station 26 via the telephone line 28, which is provided with a similar lightning arrestor 62.

Transmission over the standard telephone line 28 is implemented at 2400 Baud. The data may optionally be sent back to the control centre by a data radio network, such as mobile trunked radio.

The most recent copy of the received messages is time stamped to the nearest second and stored in a buffer 64 until successfully transmitted to the central control station 26, or alternatively for a period of 24 hours. The buffer 64 is capable of holding up to 100 messages. Each receiving station 22 incorporates an omni-directional antenna 66 mounted at least 10 m above the ground, and connected to the receiver 58 via an antenna cable 68. The antenna 66 may be mounted on a separate mast 70, or it may alternatively be fixed to a high building or the like. A directional antenna 72 with a controller 74 connected to the receiver 58 may also be provided. This unit automatically determines the direction of incoming identification signals and passes the directional data to the receiver 58. The latter incorporates the directional information with the data transmitted to the control station 26.

The signpost stations 12.1 to 12.14 are arranged to transmit a 40 bit message at the same frequency as a keyring activator 40. The code can be set by means of a DIP switches or wire jumpers. Output power is sufficient for a beacon receiving antenna 34 well concealed in a vehicle 18 to be able to receive a message at 50 m or more. The lifetime of the batteries of the signpost beacons is preferably more than ten years, after which time the whole unit may be replaced. The signpost station can either be triggered by an activated beacon unit 20 passing within its range of 50 m, or alternatively it can transmit approximately once per second, with a duty cycle of 50:1.

The signpost beacon is packaged in a rugged enclosure which is weatherproof and able to withstand extremes of temperature and heat, as well as rough handling. A suitable clamp may be provided for mounting the signpost station on a pole or the like.

The central control station 26 includes a 386-or 486-microprocessor having connections to several 2400 band modems or radios. Each message received is stamped as to its time of receipt and as to which of the receivers 22.1 to 22.3 detected the alarm signals. The incoming messages are either displayed on the area map which indicates a location of the active receiver and the last signpost stations passed, or on the screen of a monitor. Codes indicating the message type (theft, hijack etc) are also provided. In this way the movement of a stolen vehicle 18 can be plotted and the deployment of the response forces can be planned.

We claim:

1. A vehicle tracking system comprising:

an array of signpost stations distributed strategically and non-uniformly around an area to be monitored, each signpost station being arranged to transmit a signpost identification signal defining a signpost footprint covering at least one route traversed by vehicles, with the signpost footprints of adjacent signpost stations being substantially non-overlapping;

a vehicle-based receiver arranged to receive the signpost identification signal in the event of the vehicle being located within the associated signpost footprint of a signpost station;

a vehicle-based beacon transmitter arranged to transmit a vehicle identification signal and a vehicle location signal derived from the signpost identification signal;

activating means for activating the beacon transmitter in response to unauthorized act being carried out on the vehicle;

a central control station for identifying the vehicle and determining its approximate position on the basis of the vehicle identification and location signals transmitted from the beacon transmitter;

at least one mobile tracking and recovery unit having a position locating unit for homing in on the vehicle once its approximate position has been established; and a network of receiver stations which is more widespread than the array of signpost stations, each receiver station having receiving means arranged to receive the vehicle identification and location signals originating from the vehicle-based transmitter and transmission means for relaying the signals to the central control station, the receiver stations including position locating means for generating, on the basis of the received vehicle identification signal, and separately of the vehicle location signal, a positional signal relating to the position of the vehicle.

2. A vehicle tracking system according to claim 1 in which remote arming means are provided for selectively arming and disarming the vehicle-based receiver and beacon transmitter.

3. A vehicle tracking system according to claim 1 which includes a short range remote activator for triggering the beacon transmitter, the short range remote activator including entry means for entering various emergency condition codes for transmission to the central control station via the vehicle-based receiver.

4. A vehicle tracking system according to claim 1 in which the vehicle identification signal and the vehicle location signal form a combined signal comprising vehicle identification data, message type data including hijack, normal theft, breakdown and medical emergency data, input status data including door, brake, ignition, boot and bonnet data, signpost data and checking data.

5. A vehicle tracking system according to claim 1 in which the vehicle location signal comprises signpost identification data representative of at least two signpost stations having substantially non-overlapping footprints which have most recently been traversed by the object, and timing data representative of the time lapsed since traversing of the signpost stations.

6. A method of tracking a vehicle comprising the steps of:

(a) strategically distributing in an area to be monitored an array of signpost stations having associated signpost footprints defined by a respective signpost identification signal transmitted from a respective associated signpost station, so that each signpost footprint covers at least one route typically traversed by a vehicle, and is substantially non-overlapping relative to signpost footprints of adjacent signpost stations;

(b) transmitting a signpost identification signal from at least one of the signpost stations;

(c) receiving the signpost identification signal at the vehicle in the event of the vehicle moving into the associated signpost footprint of the signpost identification signal;

(d) transmitting from a vehicle-based transmitter a vehicle identification signal and a vehicle location signal derived from the signpost identification signal in the event of an unauthorized act being carried out on the vehicle;

(e) identifying and locating the approximate position of the vehicle on the basis of the vehicle identification and location signal;

(f) tracking and recovering the vehicle by means of at least one mobile tracking unit using the approximate position of the vehicle as a reference;

(g) distributing in the area to be monitored a network of receiver stations which is more widespread than the network of signpost stations, receiving, at one of the receiver stations, the vehicle identification, location and status signals originating from the vehicle-based transmitter;

(h) relaying the vehicle identification, location and status signals to a control station;

(i) monitoring the progress of the vehicle at the control station;

(j) providing, at least some of the receiver stations, position locating means for generating a positional signal on the basis of the vehicle identification signal and independently of the signpost identification signal; and (k) transmitting the positional and vehicle identification signals to the control station.

7. A method defined in claim 6 wherein the step (c) includes the steps of:

accumulating a plurality of different signpost identification signals as the vehicle moves through successive nonoverlapping footprints associated with different signpost stations, and transmitting the plurality of the signpost identification signals to the central control station for enabling the route of the vehicle to be tracked.

8. A method defined in claim 6 further comprising the steps of entering message type data for receipt at the vehicle and of transmitting from the vehicle message type data in conjunction with the vehicle location and identification signals.

* * * * *